(12) United States Patent
Naven et al.

(10) Patent No.: US 8,174,978 B2
(45) Date of Patent: May 8, 2012

(54) METHOD FOR CONGESTION MANAGEMENT OF A NETWORK, A SIGNALLING PROTOCOL, A SWITCH, AN END STATION AND A NETWORK

(75) Inventors: Finbar Naven, Cheshire (GB); Ian David Johnson, West Sussex (GB); Jose Duato, La Eliama Valencia (ES); Jose Flich, Nules Castellon (ES)

(73) Assignee: Xyratex Technology Limited, Havant (GB)

( * ) Notice: Subject to any disclaimer, the term of this patent is extended or adjusted under 35 U.S.C. 154(b) by 841 days.

(21) Appl. No.: 10/590,209

(22) PCT Filed: Mar. 4, 2005

(86) PCT No.: PCT/GB2005/000836
§ 371 (c)(1),
(2), (4) Date: Jun. 27, 2008

(87) PCT Pub. No.: WO2005/086435
PCT Pub. Date: Sep. 15, 2005

(65) Prior Publication Data
US 2008/0253289 A1    Oct. 16, 2008

Related U.S. Application Data

(60) Provisional application No. 60/550,058, filed on Mar. 5, 2004, provisional application No. 60/622,995, filed on Oct. 29, 2004.

(51) Int. Cl.
*G01R 31/08* (2006.01)
(52) U.S. Cl. ........................................ 370/235; 370/252
(58) Field of Classification Search .................. 370/503, 370/229–253, 389–427, 466–473; 709/203, 709/235, 35
See application file for complete search history.

(56) References Cited

U.S. PATENT DOCUMENTS
6,657,963 B1 * 12/2003 Paquette et al. ............... 370/236
(Continued)

FOREIGN PATENT DOCUMENTS
EP    717 532    6/1996
(Continued)

OTHER PUBLICATIONS

Schroeder et al., "Autonet: A High-Speed, Self-Configuring Local Area Network Using Point-to-Point Links," IEEE Journal on Selected Areas in Communications, IEEE Inc., New York, U.S., vol. 9, No. 8, Oct. 1, 1991, pp. 1318-1335.

(Continued)

*Primary Examiner* — Pao Sinkantarakorn
*Assistant Examiner* — Iqbal Zaidi
(74) *Attorney, Agent, or Firm* — Pillsbury Winthrop Shaw Pittman LLP

(57) ABSTRACT

A method of congestion management within a switch or network of connected switches is provided, wherein the or each of the switches has a plurality of ingress ports and a plurality of egress ports. The method involves, when congestion is detected at a first ingress or egress port, sending a message to an upstream port connected to the first ingress or egress port indicating that congestion has occurred at a particular port and requesting storage at the upstream port of data packets destined for that port; and, in dependence on the amount of data packets destined for the congested port stored at the upstream port, sending from the upstream port to a further upstream port a message informing the further upstream port of the congestion at the congested port, the further upstream port storing at the further upstream port data packets destined for the congested port.

35 Claims, 13 Drawing Sheets

U.S. PATENT DOCUMENTS

| | | | |
|---|---|---|---|
| 7,286,552 B1 * | 10/2007 | Gupta et al. | 370/413 |
| 2003/0185154 A1 * | 10/2003 | Mullendore et al. | 370/230 |
| 2003/0193959 A1 * | 10/2003 | Lui et al. | 370/401 |
| 2005/0088969 A1 * | 4/2005 | Carlsen et al. | 370/229 |
| 2005/0147032 A1 * | 7/2005 | Lyon et al. | 370/229 |
| 2010/0118703 A1 * | 5/2010 | Mayhew | 370/235 |

FOREIGN PATENT DOCUMENTS

| | | | |
|---|---|---|---|
| EP | 0717532 | * | 12/1998 |
| WO | WO2006/032978 | * | 9/2005 |

OTHER PUBLICATIONS

International Preliminary Report on Patentability for application PCT/GB2005/000836.

Written Opinion of the International Search Authority in application PCT/GB2005/000836.

* cited by examiner

Strategy 2.1 (Form new CAM lines)

Link in hot queue A1B1 to activate new more specific hot queue A1B1C1

Cold queue (R/L means Request is received, and Link is formed)

| 0 | A1B1C1 | 10 | A1B1C1 | 20 | A1B1C1 | 30 | A1B1C1 | 40 | A1B1C1 |
|---|---|---|---|---|---|---|---|---|---|
| 1 | C2 | 11 | C2 | 21 | C2 | 31 | C2 | 41 | C2 |
| 2 | B2C1 | 12 | B2C1 | 22 | B2C1 | 32 | B2C1 | 42 | B2C1 |
| 3 | C2 | 13 | C2 | 23 | C2 | 33 | C2 | 43 | C2 |
| 4 | B3C1 | 14 | B3C1 | 24 | B3C1 | 34 | B3C1 | 44 | B3C1 |

R/L A1B1    R/L A1      Req A1B1C1
            (Less)      (More)

|  | CAM | Hot Queue |  |
|---|---|---|---|
| Link 0 | A1B1 | 10 | A1B1C1 |
|  |  | 11 | C2 |
|  |  | 20 | A1B1C1 |
|  |  | 21 | C2 |
|  |  | 31 | C2 |
|  |  | 41 | C2 |
| Link 1 | A1 | 22 | A1B2C1 |
|  |  | 23 | C2 |
|  |  | 24 | B3C1 |
|  |  | 32 | A1B2C1 |
|  |  | 33 | C2 |
|  |  | 34 | B3C1 |
|  |  | 42 | B2C1 |
|  |  | 43 | C2 |
|  |  | 44 | B3C1 |
| Link 2 | A1B1C1 | 30 | A1B1C1 |
|  |  | 40 | A1B1C1 |

Link A1B1C1

Fig. 10

Strategy 2.2 (Overwrite Existing CAM Lines)

Overwrite and relink shortest existing hot queue (A1) to cold queue

Cold queue

| 0 A1B1C1 | 10 A1B1C1 | 20 A1B1C1 | 30 A1B1C1 | 22 A1B2C1 | 40 A1B1C1 |
|---|---|---|---|---|---|
| 1    C2 | 11    C2 | 21    C2 | 31    C2 | 23    C2 | 41    C2 ? |
| 2   B2C1 | 12  B2C1 | 22  B2C1 | 32  B2C1 | 32 A1B2C1 | 42  B2C1 |
| 3    C2 | 13    C2 | 23    C2 | 33    C2 | 33    C2 | 43    C2 |
| 4   B3C1 | 14  B3C1 | 24  B3C1 | 34  B3C1 | 34  B3C1 | 44  B3C1 |
| R/L A1B1 | R/L A1B2 | R/L A1 (Less) | Req A1B1C1 (More) | Relink A1 | |

|  | CAM | Hot Queue | |
|---|---|---|---|
| Link 0 | A1B1 | 10 A1B1C1 | Keep A1B1 in existence, to catch new A1B1C2 |
|  |  | 11    C2 | packets (eg packet 41) |
|  |  | 20 A1B1C1 |  |
|  |  | 21    C2 |  |
|  |  | 30 A1B1C1 |  |
|  |  | 31    C2 |  |
|  |  |  | Link A1B1C1 |
|  |  | 41   B1C2 ? |  |
| Link 1 | A1B2 | 22 A1B2C1 | Relink to cold queue |
| 2 | A1 | 23    C2 |  |
| 3 | A1B1C1 | 32 A1B2C1 | Relink to cold queue |
|  |  | 33    C2 |  |
|  |  | 34  B3C1 |  |
|  |  | 40 A1B1C1 |  |

Fig. 11

METHOD FOR CONGESTION MANAGEMENT OF A NETWORK, A SIGNALLING PROTOCOL, A SWITCH, AN END STATION AND A NETWORK

CROSS REFERENCE TO RELATED APPLICATIONS

This is the U.S. National Phase of PCT/GB2005/000836, filed Mar. 4, 2005, which in turn claims priority to U.S. Provisional Application Ser. No. 60/550,058, filed Mar. 5, 2004 and Ser. No. 60/622,995, filed Oct. 29, 2004, all of which are incorporated herein in their entirety by reference.

The present invention relates to a method of congestion management within a switch or a network of connected switches. The invention also relates to a switch, an endstation, a network and a signaling protocol for managing congestion within a network of switches.

In embodiments the invention relates to a method of congestion management within a single switch or within a network of connected switches, including the corresponding endpoints. In embodiments the invention also relates to the switch architecture and a signaling protocol for managing congestion within a network of one or more switches.

From observation it is known that as traffic within a network of switches approaches saturation, throughput of traffic on the network significantly degrades in most networks. Therefore, to utilise switches and link bandwidth in a cost effective way, efficient congestion management is required to prevent throughput degradation whilst still allowing the network to be operated close to saturation in a stable manner.

Contention within a network occurs when several data flows across a network contend for access to the same egress port of a switch within the network. If the bandwidth provided by the egress port is not high enough to service all requests made of it then the contention becomes congestion. Data packets that cannot make forward progress are buffered in queues. If congestion persists those queues are filled. If filled or blocked queues are not prevented from forming, or if action is not taken to alleviate the blockages as they form then this leads to congestion which can spread rapidly throughout the network between connected switches, forming what is known as a congestion tree. This can cause substantial inefficiencies in large networks and may even result in total fabric collapse.

The main reason for the above-mentioned inefficiencies is an effect known as Head of Line (HOL) blocking. This occurs in network end stations and in a fabric of switches of any size and topology. HOL blocking occurs whenever a queue stores data packets for different destinations and the packet at the head of that queue is prevented from being forwarded because its destination is unable to accept the packet. This is usually a consequence of several flows contending for access to the same egress port of a switch within the network. These aggregation effects apply both internally to a switch and between the switches in a fabric. Subsequent packets in a blocked queue, i.e. packets behind the head of the line may be intended for different destinations which are able to accept the packets but these packets are still prevented from being forwarded by the blocked packet at the head of the line. As a consequence, throughput may degrade dramatically.

Two independent groups of solutions have been traditionally proposed to address this problem. These groups of solutions behave in very different ways. The first group relies on modification of how end-station equipment injects traffic into packet switches or networks of switches. Solutions in this group usually modify the rate at which packets are injected into the network, and are referred to either as Network Admission Control, Congestion Control, or Injection Limitation techniques. The second group of solutions includes the techniques that directly avoid HOL blocking by providing separate buffers for different flows or extra hardware paths to avoid waiting for packets at the head of the line.

Unfortunately, none of the previously proposed solutions is really scalable. When the switch fabric size increases, the system begins to oscillate when using the first group of solutions. This is due to delay loops and the fact that end stations that inject the traffic into a network have at best a very limited visibility of the effects of their largely uncoordinated forwarding activity. Using the second group of solutions, the extra hardware cost becomes prohibitive when the switch fabric size increases.

Congestion Management has been studied extensively in the context of TCP/IP protocols and a number of solutions is available. However, all of these solutions are based on dropping packets when congestion is detected. Therefore, these solutions are not suitable for switch fabrics where packet dropping is not allowed, as is the case for fabrics used as System Area Networks (SAN), cluster interconnects, and parallel computer interconnects.

A well known solution to the HOL blocking problem is Virtual Output Queuing (VOQ). Typically, separate queues are kept at the ingress of a switch and these queues are maintained on a per switch egress port basis usually for each of the individual traffic flows through the port. In a multi-stage fabric if queues were maintained for the intermediate or indeed the ultimate egress ports of the entire fabric the number of queues would rapidly become very large since it grows exponentially with the number of stages. Therefore VOQs are normally maintained only for the individual switch egress ports and flows within each switch at every stage in a fabric. This limitation leads to HOL blocking effects arising and to congestion spreading between the packet switching stages in a fabric.

Another known solution alleviates HOL blocking over only one hop or stage in a Multi-stage Interconnection Network (MIN). This is achieved by the establishment of a number of queues in an upstream switch which are usually pre-allocated in some fixed way to store packets for the egress ports of the next downstream switch. This solution requires signaling means between the downstream and upstream switches that is employed to provide status based flow control. This single stage limitation again leads to HOL blocking effects arising upstream from the switch that is responsive to the flow control information and to congestion spreading across the switching stages in a fabric.

Methods that attempt to manage the admission of traffic into a network operate by, in some way, detecting congestion at a point in the network and then passing messages back to the inputs that are contributing to the congestion and instructing them to reduce their rates of traffic injection. Unfortunately, this causes the network utilisation to fluctuate significantly and in many cases results in the network efficiency oscillating between saturation and under utilisation. This happens because there is a finite time delay in the closed loop control system and also because of the inevitably indeterminate nature of the selection of network inputs which may be targeted for the rate reduction requests. Additionally, solutions such as these are extremely difficult to tune, (i.e. to adjust working parameters) due to the long notification delays and the dependence of those delays on the size of the switch fabric.

According to a first aspect of the present invention, there is provided a method of congestion management within a switch or a network of connected switches wherein the or each of the switches has a plurality of ingress ports and a plurality of egress ports, the method comprising:

when congestion is detected at a first ingress or egress port, sending a message to an upstream port connected to the first ingress or egress port indicating that congestion has occurred at a particular port and requesting storage at the first upstream port of data packets destined for the congested port; and in dependence on the amount of data packet destined for the congested port stored at said upstream port, sending from said upstream port to a further port a message informing said further upstream port of the congestion at the congested port, said further upstream port storing at said further upstream port data packets destined for the congested port.

Preferably, the method comprises at said upstream port creating an entry in a control memory, e.g. an associative memory or CAM, to indicate that congestion has occurred at the congested port; and, checking packets subsequently received at said upstream port against the entry in the memory and, if a packet is directed to the congested port, storing said packet in a corresponding set aside queue, i.e. a queue for data packets destined for a congested port.

Preferably, the method comprises at said upstream port, allocating memory for use as the set-aside-queue for data packets destined for the congested port.

Preferably, the method comprises de-allocating one or more set aside queues in dependence on one or more criteria such as the amount of data in the set aside queue or whether a token has been received by a port, CAM line or switch. This will be explained below.

In one specific example, when a request for storage of data packets received at any of the ports in the congestion tree is in respect of congestion at a port further downstream than the root of the congestion tree, the request is accepted such that data packets destined for said further downstream port are stored at the port at which the request was received According to a second aspect of the present invention, there is provided a signaling protocol for managing congestion within a network of switches, the protocol comprising:

a first message for sending from a first port at which congestion is detected to an upstream port connected to the first port, the first message requesting establishment at the upstream port of a set aside queue for storing data packets received by the upstream switch destined for the source of congestion, the message including a token for storage by said upstream port.

According to a third aspect of the present invention there is provided a switch for use in a network of switches, the switch comprising:

two or more ingress ports;
two or more egress ports;
a switch fabric for selectively coupling data packets received at one or more of the ingress ports to one or more of the egress ports;
storage for, in response to a request for storage of data packets destined for a downstream congested port, storing selected data packets;
selection means, for selectively routing a received data packet to the storage in dependence on the detected desired destination of the packet; and
request generation means arranged to send a request to a further upstream port to request storage of data packets destined for the congested port at said further upstream port when a threshold amount of data packets are stored in the storage.

According to a fourth aspect of the present invention there is provided a network of interconnected switches, comprising a plurality of switches arranged in a topology, the network comprising at least two switches according to the third aspect of the present invention, the at least two switches being connected directly to each other.

According to a fifth aspect of the present invention there is provided a switch for use in a network of switches, the switch comprising:

a plurality of ingress ports for receiving data packs;
a plurality of output ports for transmitting data packets; and,
control means for selectively routing data packets received at one or more of the ingress ports to one or more of the egress ports;
wherein at least one of the ingress ports or egress ports comprises storage for storing details of a congestion tree comprising at least three connected ports in which in use, the switch is located.

In embodiments the invention provides a solution to the Congestion Management problem. In particular embodiments the invention comprises a set of means and a method to manage network admissions and reduce or eliminate congestion spreading due to HOL blocking effects over several hops of a MIN with any topology. This is achieved by preventing HOL blocks from forming. The invention enables network end stations and single stage switches to make more effective use of their queuing resources and also enables a multi-stage switch fabric to behave substantially as if it were a large single stage switch.

According to a sixth aspect of the present invention there is provided a signaling protocol for managing congestion within a network of switches, the protocol comprising:

a first message for sending from a first port at which congestion is detected to an upstream port connected to the first port, the first message requesting storage of data packets received by said upstream port destined for the congested port; and, a second message for sending by the upstream port to a port further upstream when a threshold amount of data packets destined for the congested port have been received and stored by said upstream port, said message requesting storage of data packets destined for the congested port received by said further upstream port.

Preferably, in the protocol when storage is requested by either a message from the congested port or the message from said upstream port, said upstream port and said further upstream port respectively are controlled to allocate a set aside queue at said upstream port or at said further upstream port respectively for storage of data packets destined for the congested port.

According to a seventh aspect of the present invention there is provided an endstation for use in a network of interconnected switches, the end station comprising:

an ingress port for receiving data packets from a network to which in use the end station is connected;
an egress port for providing data packets to a network to which in use the end station is connected;
in which the egress port comprises means operable in use to receive a message from a downstream port, the message containing data relating to a congested port downstream and a request to provide storage for data packets destined for the congested port downstream.

In embodiments the invention provides a scaleable solution to the Congestion Management problem. In particular embodiments the invention comprises a set of means and a method to manage network admissions and reduce or eliminate congestion spreading due to HOL blocking effects over several hops of a multi-stage interconnect network (MIN) with any topology. This is achieved by preventing HOL blocks from forming. The invention enables network end stations and single stage switches to make more effective use of their queuing resources and also enables a multi-stage switch fabric to behave substantially as if it were a large single stage switch.

In embodiments the invention uses a means to set aside traffic causing HOL blocking to allow traffic, which would otherwise be prevented from flowing through the switch or network by the blocked traffic, to flow on through the switch to unblocked network routings. It is preferred that the means includes a low bandwidth signaling method across the switch network to set aside traffic at the Head of Line in a queue, the method not requiring significant switch network bandwidth. Preferably, the method is capable of responding quickly enough to prevent the entire switch network becoming locked up through the rapid escalation of congested traffic. Unlike solutions based on VOQs, in one particular embodiment the invention uses a fixed amount of control memory at each switch ingress/egress port regardless of the size of the switch fabric.

The invention is applicable to network end stations, single stage switch elements and Multi-stage Interconnection Networks of switches, including regular and irregular interconnection patterns between stages and for fabrics of any size and topology.

The invention provides a scalable and cost-effective solution to the Congestion Management problem. In an embodiment, it solves the HOL blocking problem in a scalable manner by using a fixed amount of extra buffer resources in a particular way. Hence, it provides all the benefits provided by solutions that avoid HOL blocking but without introducing scalability problems. The invention also provides benefits of the solutions in the group of Network Admission Control while avoiding network utilisation variation effects.

This invention allows end stations to be properly responsive to a user specified network admission policy in a single stage or Multi-stage Interconnection Network (MIN). In operation it provides all the necessary information to enable end-stations to manage the rate at which they inject traffic for all destinations in a properly co-ordinated and stable manner.

It will be appreciated that when some data packets are selected for storage at a particular port in the network, the possibility of out of order (OOO) effects can occur. For example, if a sequence of data packets destined for the same congested port arrives at an upstream port, and in the time between arrival of the first and second of the data packets destined for the congested port the congestion clears it could be that the second data packet is sent to the now uncongested port before the first data packet. To address this problem, a preferred requirement is that, if a request for establishment of a set aside queue is received at a port and the request is in respect of a port further downstream than the furthest downstream already congested port, then this request is ignored.

This stipulation of ignoring requests for establishment of set aside queues at a port in respect of a congested port further downstream than the furthest downstream already congested port serves to ensure that OOO effects do not occur. In practice, if this requirement is enforced it means that once a congestion tree has been established, the root of the congestion tree can not be moved downstream. In most applications this is acceptable. For example, if within a network there is a congestion tree made up of ports 1, 2, 3 and 4, a data packet destined for port 2, does not need to know that there is also congestion at port 4, further downstream from port 3.

FIG. 1 shows an example of a network of interconnected switches the network comprising 8 input devices D0 to D7 connected to a three-stage network of switches (stages A, B and C). The network is configured such that each of devices D0 to D7 may send data to either or both of devices DA or DB. In some applications, it is necessary to save the state of all the ingress devices D0 to D7 simultaneously. In the example shown in FIG. 1, it may well be that all the state data at some point in time from the ingress devices D0 to D7 will be sent to device DA.

When all ingress devices start simultaneously to transmit data packets to DA, congestion (due to contention) will initially happen at the egress port 0 of the A stage switches, i.e. A00, A10, A20 and A30. Using the congestion management method described above, this congestion is signaled to the ingress devices so that, for example, each input device may now only transmit data for device DA at 50% of link capacity.

The next congested ports will be port 0 of each of the B stage switches B0 and B1. These switches will in turn signal back to their respective A stage switches that their ports 0 are congested. Then the A stage switches will signal to their respective ingress devices that the downstream switch ports B00 and B10 are congested. Now, each ingress device D0 to D7 may, for example, only send data packets destined for DA at 25% of link capacity. The situation will be repeated at port C0, thereby limiting the effective transmitting capacity to DA to about 12% of link capacity.

If the A stage switch egress ports 0 are seen as a congestion root, then data packets simply passing through the port A20 will be assigned to a set aside queue for the ports of switch B1 in switch A2, even if the data packets are destined for port B11 which is not congested instead of port B10. In other words, by ensuring that requests for establishment of set aside queues for data packets destined for congested ports further downstream than the furthest downstream already existing congested port are not accepted, the amount of link capacity used between other uncongested ports may unnecessarily be reduced.

To address this, preferably in the method according to the first aspect of the present invention the step of requesting storage at the upstream port of data packets destined for the congested port comprises requesting establishment of a set aside queue for storage of said data packets; and data packets stored at said further upstream port are stored in a set aside queue for data packets destined for the congested port thereby establishing an original congestion tree; and when a subsequent request for storage of data packets is received at any of the ports in the original congestion tree in respect of congestion at a port further downstream than the root of the original congestion tree, the request is accepted at the port such that data packets destined for said further downstream port are stored at the port at which the request was received thereby extending the congestion tree downstream.

In this example, the invention provides a means for enabling movement of the root of a congestion tree downstream. Accordingly, in networks of the type shown in FIG. 1, network utilisation may be maximised. In this aspect, the invention provides a congestion management method for applications in which it is necessary to be able to move the root of a congestion tree downstream or rather to allow a congestion tree that develops further downstream than an existing root to exist simultaneously with the existing tree.

As explained above, 000 effects may arise if requests for establishment of set aside queues further downstream than an existing congestion tree root are accepted.

Preferably, the method comprises establishing one or more links between the set aside queue of data packets destined for the further downstream port and the set aside queue of data packets destined for one or more of the other congested ports in the congestion tree.

In one example, the method preferably comprises accepting all requests for establishment of set aside queues, and when said requests are for establishment of a set aside queue in respect of a port further downstream than the root of the congestion tree, placing a link in one or more of the existing set aside queues to later activate the newly formed set aside queue.

In another example the method comprises: if a request is for establishment of a set aside queue in respect of a port further upstream than the root of the original congestion tree, overwriting the existing set aside queue having fewest stages with a newly established set aside queue; and placing a link in the cold queue to the newly established set aside queue.

Alternatively, if a request is for establishment of a set aside queue in respect of a port further downstream than the root of the original congestion tree, the method comprising overwriting the existing shortest set aside queue with a newly established set aside queue corresponding to the received request; and placing a link to the newly established set aside queue in the already existing set aside queue that is the longest already existing set aside queue and that is shorter than the newly established set aside queue.

By providing links from one set aside queue to another it is possible to enable the movement of the root of a congestion tree further downstream whilst simultaneously avoiding out of order effects.

Examples of embodiments of the present invention will now be described in detail with reference to the accompanying drawing, in which:

FIG. 10 is a representation of data queues at a port of a switch in a network of switches; and FIG. 11 is a representation of data queues at a port of a switch in a network of switches.

Figure 2:
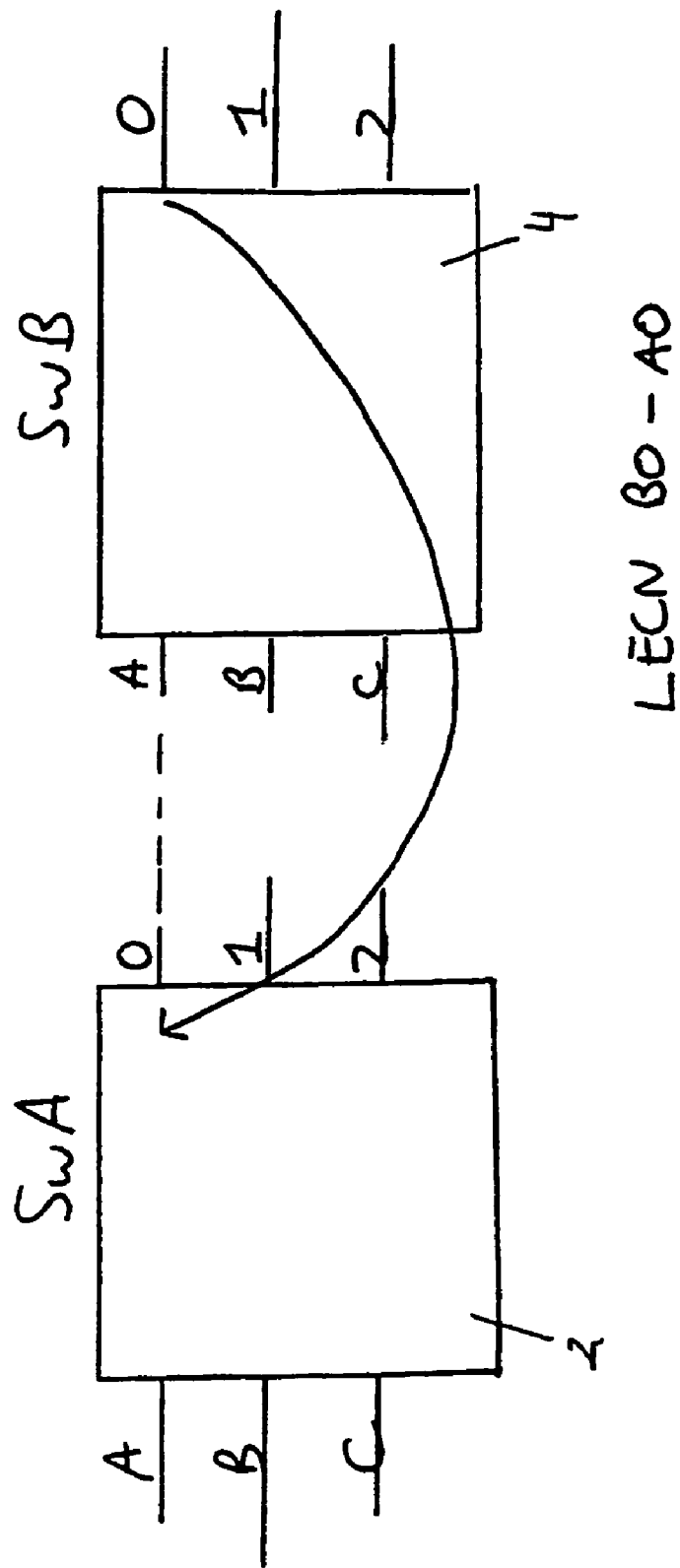
FIG. 2 shows a schematic representation of a conventional network of switches.

FIG. 2 shows a schematic representation of a network of switches 2 and 4. Each of switches 2 and 4 have a number of ingress ports A to C and a number of egress ports 0 to 2. In normal use, i.e. when there is no congestion, a data packet is received at an ingress port A to C of a switch and routed to one of the output ports 0 to 2 of the respective switch 2 and 4. The network operates a local explicit congestion notification LECN protocol such that, for example, if a port on switch 4 becomes congested it sends a signal upstream to the switch port which is sending it data to temporarily stop transmission or to modulate the transmission in some way so that the blockage is able to clear. In the examples shown, a signal is sent from port 0 of switch 4 to port 0 of switch 2 to instruct it temporarily to stop transmission. Data destined for port 0 of switch 4 is queued at port 0 of switch 2 in a set aside queue (SAQ). Other possible data paths, e.g. from port 0 of switch 2 to port 1 of switch 4, are unaffected.

Figure 3:
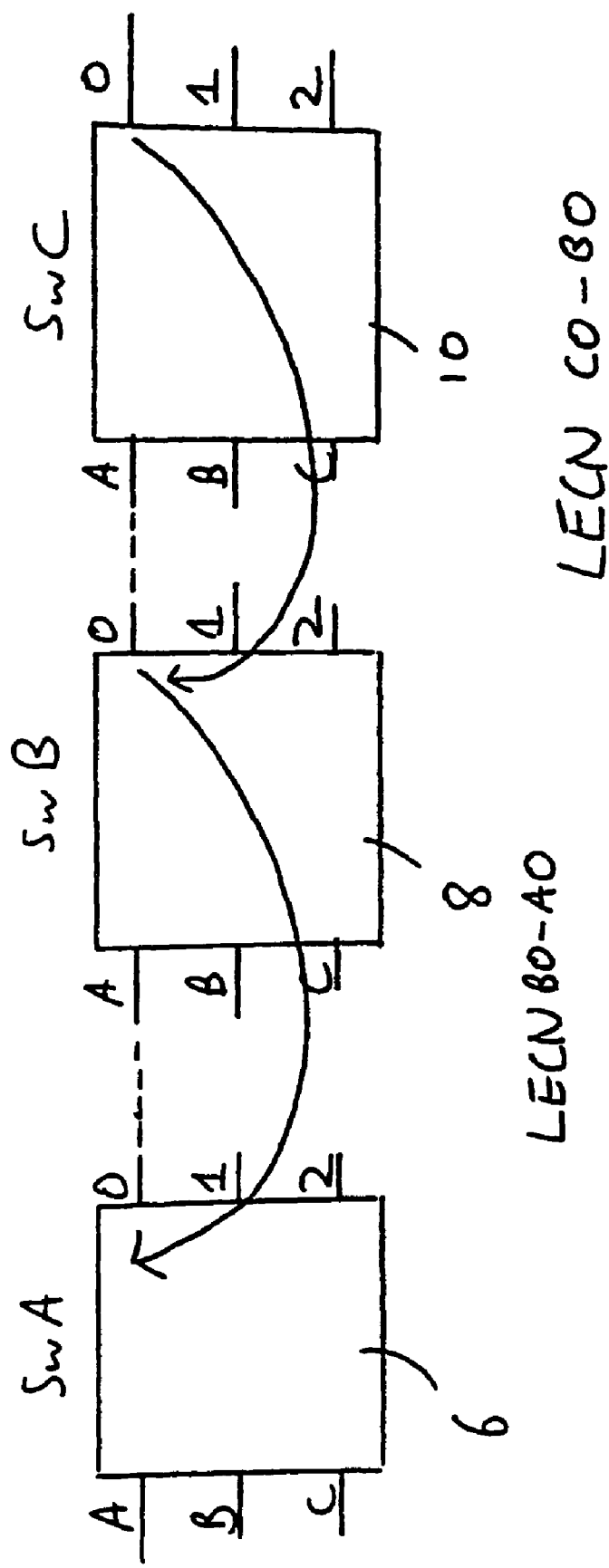
FIG. 3 shows a further example of a conventional network of switches.

FIG. 3 shows an example of a conventional network of switches 6, 8 and 10 also utilising a LECN protocol as described above with reference to FIG. 2. In this case, when congestion is detected at port 0 of switch 10, a notification is sent to port 0 of switch 8 telling that port to stop sending data to switch 10 that is destined for port 0 of switch 10. If port 0 of switch 8 subsequently becomes congested, it sends a similar notification to, for example, port 0 of switch 6 which blocks data from all input ports A to C of switch 6 intended for port 0 of switch 8. Now, data unrelated to the congestion, for example, from port B of switch 6 to port 1 of switch 10 via port 0 of each of switches 6 and 8 is also blocked. Accordingly, head of line blocking occurs and a congestion tree develops. As explained above the creation of a congestion tree can have potentially serious consequences for operation of the entire network.

Figure 4A:
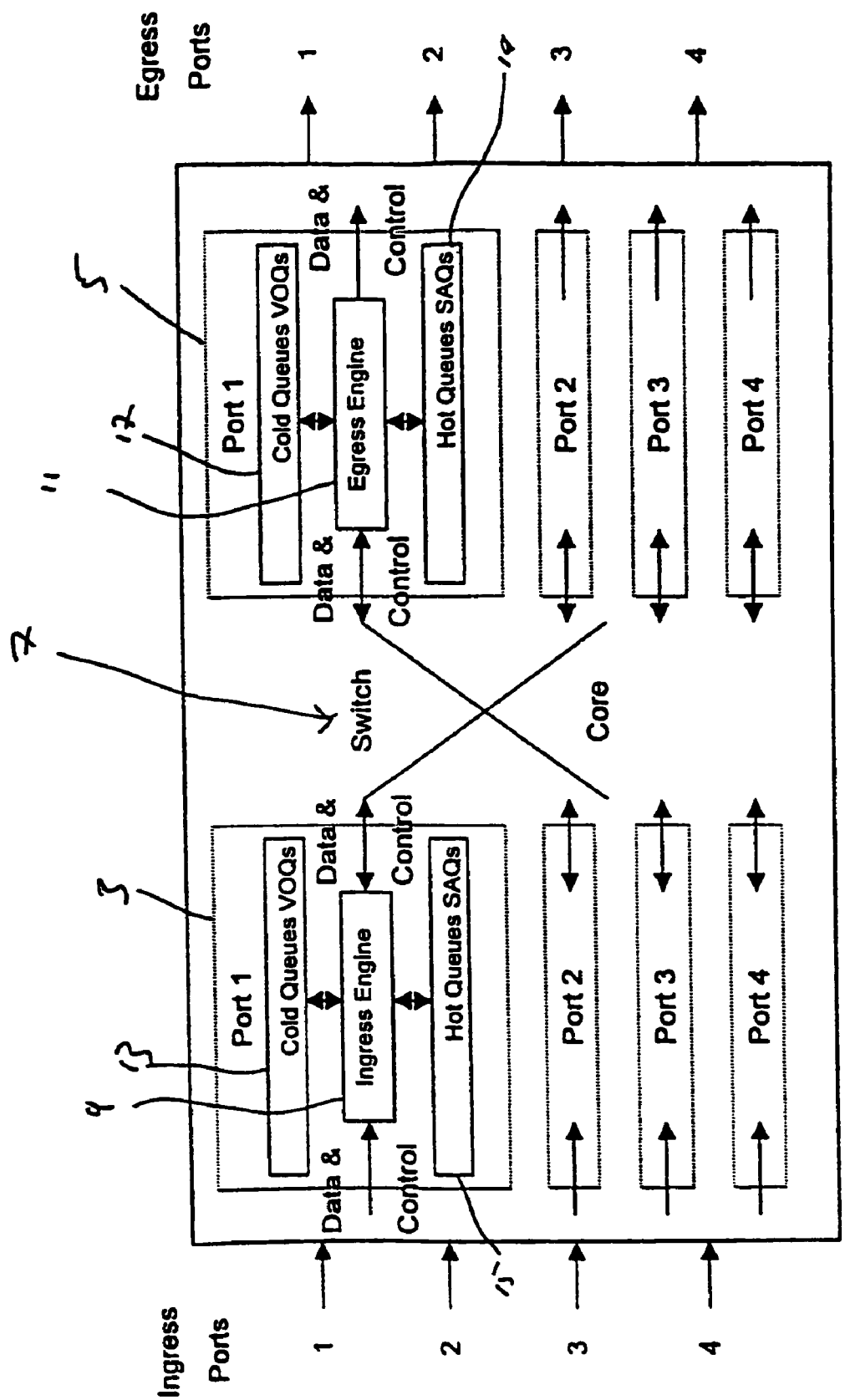
FIG. 4A shows a schematic representation of an example of a switch according to an embodiment of the present invention.

FIG. 4A shows an example of a particular type of switch according to an embodiment of the present invention. The switch comprises a plurality of ingress ports 3 and a plurality of egress ports 5. The ingress ports 3 are arranged to receive data packets from other switches within the network. The egress ports 5 are arranged to receive data packets from one or more of the ingress ports 3 and provide a route onward for the data packets. A switch architecture 7 is provided and is shown schematically and may be any suitable type of architecture controllable to couple data packets from one or more of the ingress ports 3 to a selected one or more of the egress ports 5.

An ingress engine 9 is provided in each of the ingress ports 3. An egress engine 11 is provided in each of the egress ports 5. As will be explained below the ingress engine 9 is operable to detect incoming data packets to the ingress port 3, route the data packets to a particular egress port via an uncongested virtual output queue i.e. a cold queue 13 within the ingress port 3 or in some situations selectively route the received data packet via a SAQ 15 within the ingress port 3.

Similarly, the egress engine 11 is operable to detect incoming data packets from an ingress port and selectively route them to a cold queue 17 within the egress port 5 or to a SAQ 19 within the egress port 5. The operation of the ingress engine 9 and egress engine 11 will be described in more detail below.

It will be understood that in a network of switches such as that shown in FIG. 3, links between switches are duplex links, i.e. data can be passed directly in both directions between two directly connected switches. Accordingly, in FIG. 4A, data packets and control data are passed between ingress and egress ports within the switch by the switch fabric (core) shown schematically as a cross between the ingress and egress ports.

As will be explained below, any suitable means may be provided as the ingress engine 9 or the egress engine 11 for, amongst other functions, determining the routing of received data packets. In a preferred embodiment of the present invention, the ingress engine 9 and egress engine 11 are provided by a content addressable memory (CAM). This has the advantage that it is implementable by hardware and therefore able to operate at a high rate. Typically, the mechanism must cope with link or port bit rates of up to hundreds of gigabits. In a network of switches overall throughput of many terabits could be achieved.

The operation of the ingress engine 9 and egress engine 11 will now be described in more detail. Referring to the egress engine 11, the egress port 5 receives a request via its corresponding link ingress port from a downstream egress port of a switch within the network. The request is amongst other things a request to establish a SAQ 19 within the egress port 5. The request is considered and checked against a number of requirements and if these requirements are met, the egress engine establishes SAQ 19. Once the SAQ 19 is established, the egress engine is then operable to determine the destination of an incoming data packet received from one or more of the ingress ports and selectively route the data packet either to the cold queue 17 within the egress port 5 or to the SAQ 19.

The ingress port 3 contains equivalent features and operates in a similar manner to the manner in which the egress port 5 operates. However, a request for establishment of an SAQ is only sent to an ingress port by an egress port when a threshold is reached in the egress port SAQ. Thus SAQ usage and notification traffic is minimised. The description above in relation to the ingress and egress ports 3 and 5 is of course a simplified description and a more detailed description will now be given of the protocol by which the ingress and egress ports operate.

Figure 4B:
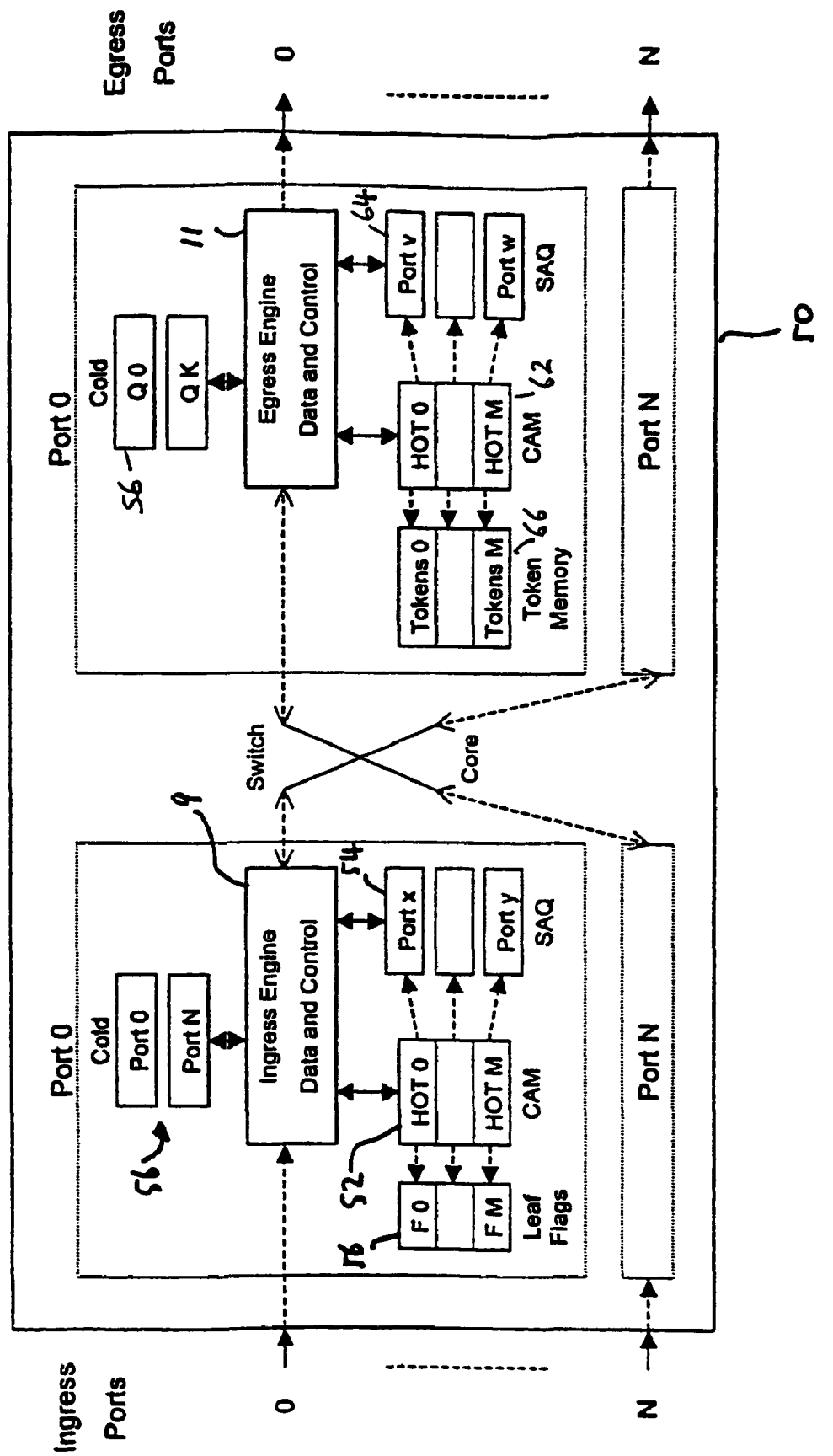
FIG. 4B shows a schematic representation of an ingress port and an egress port within an example of a switch according to an embodiment of the present invention.

FIG. 4B shows a schematic representation of an ingress port and an egress port within one particular type of switch 50 according to an example of an embodiment of the present invention. In the example shown the switch 50 has N+1 ingress ports and N+1 egress ports. In the figure, only ingress port 0 and egress port 0 are shown in any detail. Referring to egress port 0 an egress engine 11 is provided as described above with reference to FIG. 4A. The egress engine 11 is adapted to communicate with content addressable memory 62 and is operable to generate SAQs 64 in response to requests received via an ingress port from a port of a connected downstream switch.

The engine 11 is also arranged for communication with cold queues 56. The CAM 62 is arranged to communicate with SAQs 64 and also storage 66 provided for leaf tokens the purpose of which is described in detail below. Generally, when egress port 0 sends a request to an upstream port requesting establishment of an SAQ at the upstream port for storage of data packets destined for a downstream port, a leaf token is sent with the request and this is recorded in the storage or token memory 66. When the request is received by a port, the token is stored as a flag in an ingress port of the upstream switch. Owning a token allows a SAQ to be collapsed when certain conditions are satisfied, as described in further detail below.

Figure 4C:
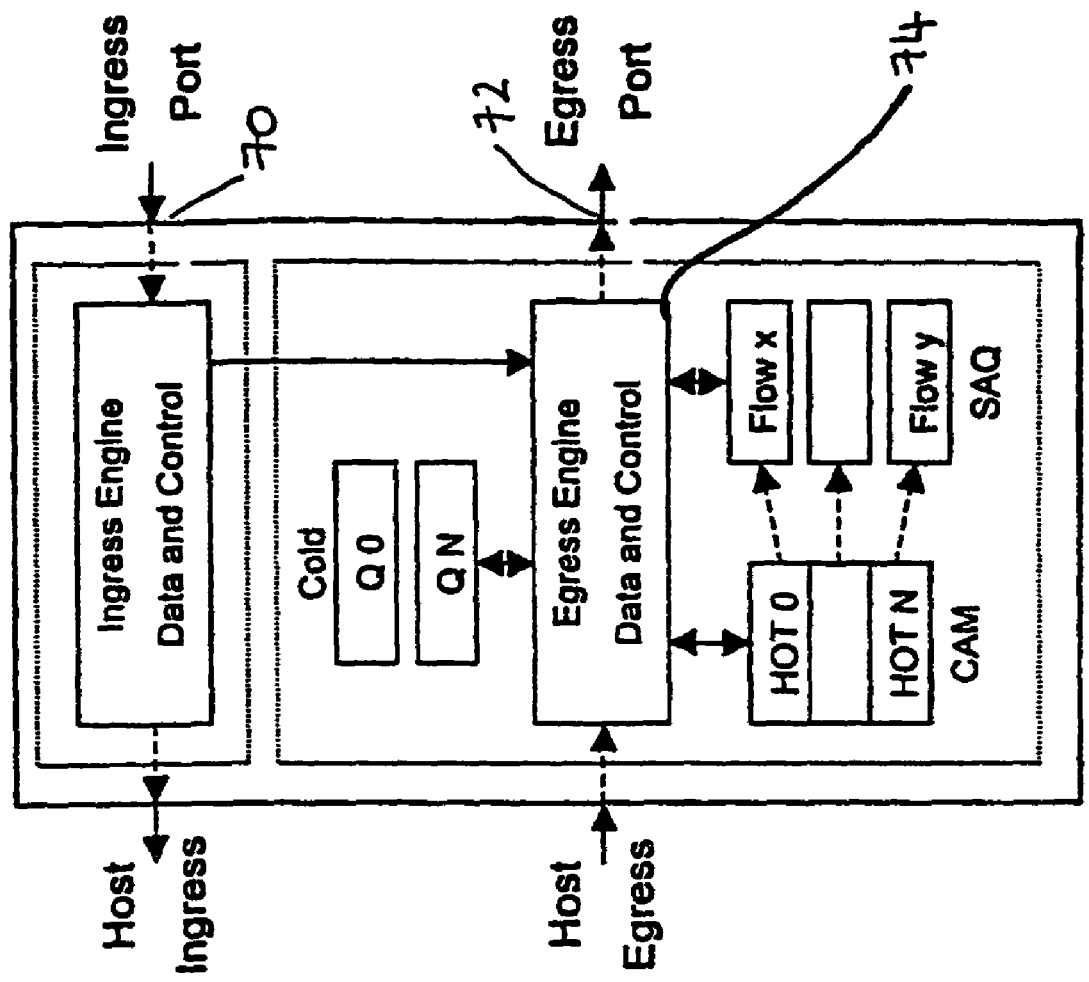
FIG. 4C shows a schematic representation of an example of an end station according to of an embodiment of the present invention.

As well as general applicability to switches within a network of interconnected switches, in one possible embodiment, the invention also relates to an end station within a network. FIG. 4C shows a schematic representation of an end station according to an example of an embodiment of the present invention. In the example shown, the end station has a single ingress port 70 and a single egress port 72 containing an egress engine 74. The end station operates in a similar manner to a switch described in detail herein except there is no selective routing of data packets between ingress and egress ports.

When requests for establishment of SAQs are received at the ingress port 70 from a downstream switch, the request is passed to the egress engine 74 within the egress port 72. The egress engine functions in a similar manner to the egress engine described above with reference to FIGS. 4A and 4B. In other words, it functions to establish SAQs and appropriate entries in a CAM to enable selective routing of data packets to either a cold queue or a SAQ within the end station, in dependence on whether or not the data packets are destined for the congested port downstream from which the request originated.

Figure 5:
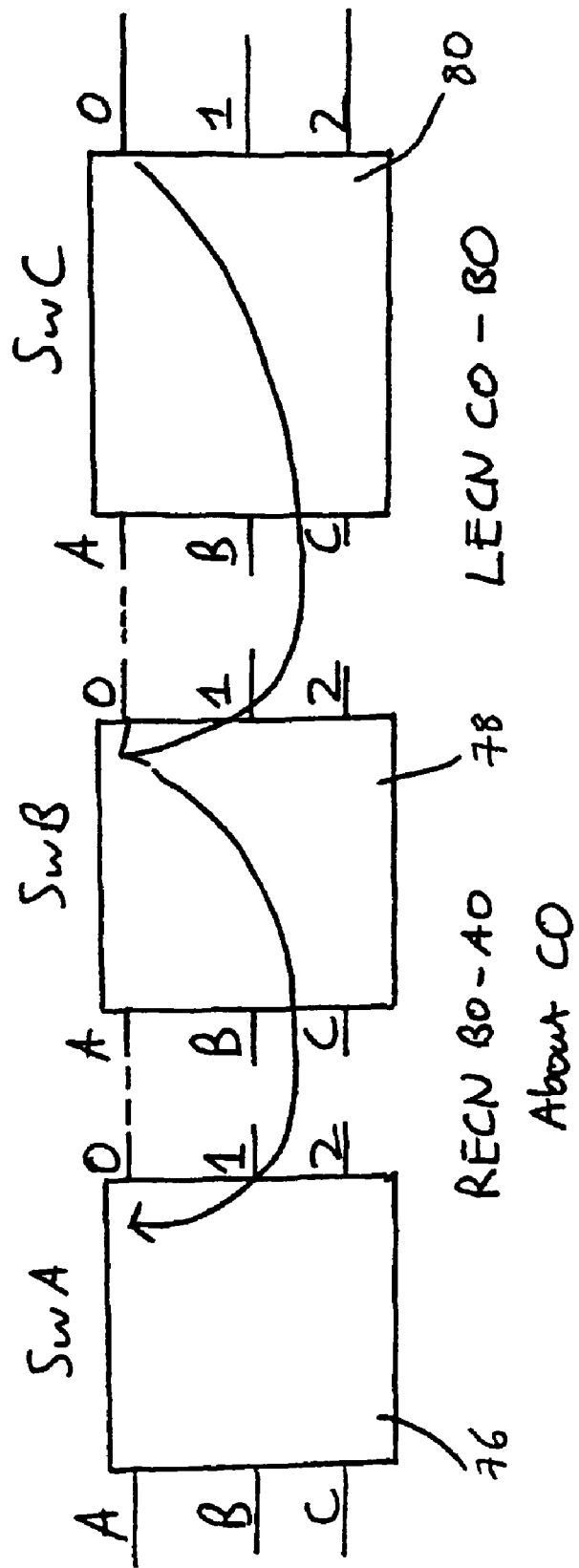
FIG. 5 shows a schematic representation of an example of a network of switches according to an embodiment of the present invention.

FIG. 5 shows a schematic representation of an example of a network of switches according to an embodiment of the present invention. In contrast to the networks shown and described with reference to FIGS. 2 and 3, in the network shown in FIG. 5, a regional explicit congestion notification (RECN) protocol is used in addition to the LECN protocol used in and described with reference to the networks of FIGS. 2 and 3.

In the example shown, the network comprises three switches 76, 78 and 80. Each switch has three ingress ports A to C and three egress ports 0 to 2. At an end station or switch e.g. switch 76, that is injecting traffic into a switch or network of switches and in an individual switch element a pool of dynamically allocated, associatively mapped SAQs are provided, as described above with reference to FIGS. 4A to 4C. Within an end station or in a single stage switch element 76 these queues are operable in a manner responsive to a Regional Explicit Congestion Notification (RECN) protocol. The RECN signaling protocol operates between and through the switches out to the end stations in a MIN to manage the allocation, population and de-allocation of the SAQs by flows which are persistently congested. The flows which are subject to this type of congestion are known as HOT flows and all other types of flow are referred to as COLD flows.

Cold flows are always mapped to cold queues formed within the ingress or egress ports as described above with reference to FIGS. 4A to 4C, regardless of their destinations. Thus, buffer requirements are minimised. This strategy does not introduce significant HOL blocking because Cold flows are not blocked. When congestion is detected, and this may happen, for example, when a certain threshold is reached in a cold queue of a particular port, a notification is sent upstream that contains information about the congested port.

When notifications are received at an upstream ingress or egress port the information on the congested port is compared by the CAM against previously stored notifications. In one embodiment, it is accepted only if it is unrelated or is more generic than previously stored notifications. Otherwise, the notification is discarded. When a notification is accepted, a line in a memory such as a content addressable memory describing it is allocated. In addition, a corresponding SAQ is allocated.

Incoming packets to the upstream switch are analysed and their intended paths compared against CAM lines. In the case of a match, the packet is known to belong to a hot flow and will be stored in a corresponding SAQ either in an ingress port or an egress port depending on where SAQs have been established. Thus any potential HOL blocking that this packet could introduce is removed.

As an SAQ at a port fills up, there will come a time at which it is filled to capacity or at least to a certain threshold level. At this point, if a packet is received at the port and if, for example the SAQ is within an egress port, a notification is transmitted from the particular egress port to one or more ingress ports. In other words, notifications are only transmitted to the ingress ports when a threshold level is reached in the SAQ in the egress port and an incoming packet for that SAQ is received. This way, SAQ usage and notification traffic are minimised. Every time a notification is accepted, it is acknowledged by a message sent by the port receiving the request to the port from which the request was received. A CAM line ID is included in the acknowledgement. By doing so, flow control is easily implemented among SAQs.

In an example, flow control may be based on the transmission of Xon and Xoff, i.e. turn on and off, messages to upstream nodes.

In a preferred example, notifications propagate a token upstream. The token identifies a Leaf Node in a congestion tree i.e. a port of a switch within the congestion tree. All the leaves in the congestion tree will contain a token. Also, a record is kept at every egress port (from which requests are sent) to keep track of the number of tokens it has sent to upstream ingress ports within the current switch.

When congestion vanishes and a given SAQ that has been allocated for a certain period of time becomes empty, it is de-allocated if the corresponding port owns a token. The associated CAM line is also de-allocated. De-allocations are notified to downstream ports or switches, and the tokens owned by the de-allocated SAQ in the leaf node are sent back towards the downstream switch.

When a given ingress port receives a de-allocation notification, it becomes the owner of the leaf token, and therefore becomes a leaf node. A given egress port must have all upstream tokens returned before it can become a leaf node. Only then can the corresponding CAM line become eligible to itself initiate the de-allocation mechanism, propagating the de-allocation notification to downstream switch ports, unless that particular switch port is the root of the congestion tree.

In the description above, CAMs are used to monitor the operation of the RECN protocol. It will be appreciated that CAMs are implementable with the use of hardware and therefore enable extremely fast control of steps in the RECN protocol. Of course, other means may be used to provide such control. In fact, any means may be used that is capable of identifying from an incoming packet whether it is destined for a congested port or not and routing it accordingly either to an SAQ or a cold queue.

Figure 6:
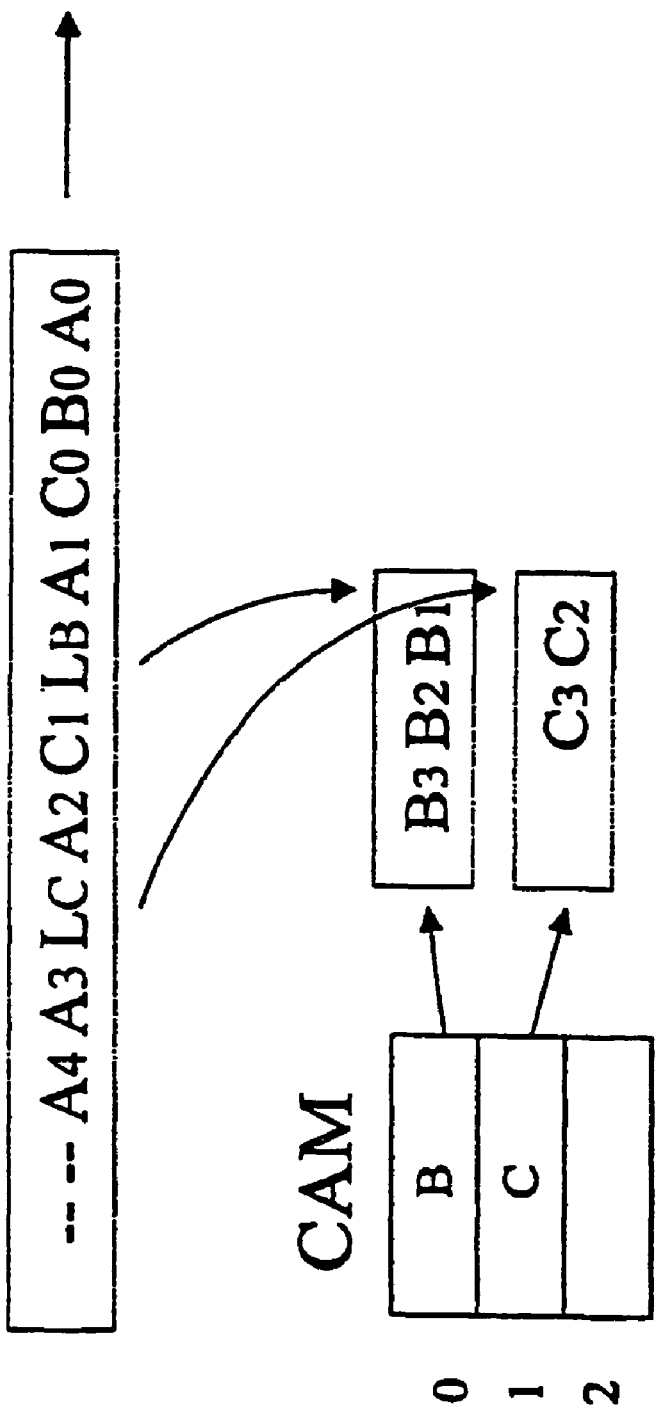
FIG. 6 shows an example of queues formed in a switch.

FIG. 6 shows a schematic representation of a cold queue and a SAQ as provided at a port of a switch in a network. As can be seen, the cold queue contains a list of data packets identified by the ports to which they are being sent. The CAM contains a number of lines 0 to 2 each containing an indication of packets that are in the SAQ CAM line details (not shown). In the cold queue, in addition to the packets, e.g. A0, B0 and C0, a number of markers $L_B$ and $L_C$ are provided. These serve as links within the cold queue to maintain the chronological order of data packets. The markers serve to make visible the SAQ to an associated scheduler.

As data packets arrive at the switch they are processed by the CAM. The CAM compares their destination to information it is storing about congestion downstream. If it is determined that the packet is destined for a port known to be congested, the packet is directed to the corresponding SAQ and a marker is provided in the cold queue of the corresponding port. If however it is determined that the packet is not destined to a known area of congestion, the packet is not directed to the SAQ but rather routed directly to the cold queue of the port.

Generally, there are two methods by which data packets may be routed within a network of switches. These are direct network addressing methods and deterministic source routing, also known as turnpool routing. In direct network addressing methods, at its origin, a packet is informed of its eventual destination. As the packet is received by switches en route to its destination, a look up table in the switch is referenced and from this look up table the appropriate egress port by which the packet should leave to continue its route to the destination is determined.

In contrast, in deterministic source routing, at its outset a binary instruction is given to a packet, the instruction containing an entire route for the packet from its origin to its destination. In the present invention, deterministic source routing or the use of turnpools is preferred due to the increased speed at which it is possible to perform routing operations.

A turnpool consists of a set of contiguous variable sized fields in a packet header, and a pointer. The pointer is initialised by the source endpoint, and addresses the first valid field in the turnpool, which specifies the address of an egress port in the first downstream switch, relative to the ingress port. The size of the field is sufficient to enable the above addressing operation for all ports in the switch. As a packet traverses the fabric, i.e. moves through the network of connected switches, the pointer is altered in each switch to address the next field in the turnpool, which will be the port addresses of the next downstream switch. There should be no remaining fields in the turnpool when the packet reaches the appropriate endpoint.

A mask size mechanism referred to in CAM addressing operations provide a means of limiting the size (or range) of the turnpool fields used to address the CAM, and/or a means of identifying the size (or range) of the fields in the stored data. A fabric can consist of a series of connected switches that are smaller than the maximum size allowed by the turnpool size (which is limited to 31 bits). Alternatively, congestion can appear anywhere within the network. Therefore only the fields within the turnpool required to address the switches between the root and leaf nodes are pertinent to the CAM operations, and these must be determined at each CAM.

An alignment operation is necessary as some paths through an irregular network are longer/shorter than others, i.e. take more/less turnpool bits to specify, so a known current position within the turnpool must be used for the alignment comparisons.

For example, consider an example of a network of 3 switches, having in turn 16 ports, 8 ports and 4 ports. These switches require a 4 bit field, a 3 bit field and a 2 bit field in the turnpool, respectively. These will be aligned in the turnpool, at bits 8 to 5, 4 to 2, and 1 to 0. If congestion occurs in the middle switch, the turnpool fields used in the CAMs will be from bits 2 upwards (towards 4, and then 8 in this case, but could be towards bit 30 in a maximum fabric).

As mentioned above, a CAM is an example of a means that can be used to provide fast processing of data packets, i.e. positioning in SAQ or cold queue, in dependence on their destination. The CAM is able to process SAQ formation requests received from a downstream port and data packet assignments for data packets received from an upstream port. In one example, the CAM is arranged to determine if a received request is more specific than any existing entries in the CAM. This is achieved by detecting if any existing entries partially match the new request. If they do, the new request is more specific than the existing entry in the CAM. In one embodiment, such requests are rejected since this would refer to a port further downstream than the root of the congestion tree in which the port is located. As will be explained below this can lead to out of order effects.

A further feature of the CAM is the line alignment for turnpool bits. In one example, active turnpool bits for all downstream switches to the congested port must be left aligned in the CAM. This enables correct determination of a packet's destination.

A RECN protocol will now be described in detail. In the example the RECN protocol is made up of four messages. These are:

1. Request to establish SAQ
2. Acknowledgement
3. Flow control
4. Deallocation

Initially, when congestion is detected at a port, the port operating in accordance with the RECN protocol sends a request message to an upstream port (could be an ingress port or an egress port depending on where the congestion occurred) that is sending data packets to the congested port to request establishment of an SAQ.

Once this request is received by the upstream port providing certain criteria are satisfied and an SAQ is to be established, the upstream port is controlled to send an acknowledgement message to the downstream port from which the request originated, informing the downstream port that an SAQ has been established.

Next, flow control messages are sent by the downstream port to the upstream port in which the SAQ has been established, to control the flow of data packets from the SAQ to the port at which (or one stage closer to the point at which) the congestion has occurred. The flow control message may contain any one of a number of instructions such as, for example, stop transmission, start transmission, modulate transmission, etc. The final message in the RECN protocol is a de-allocation message sent by the upstream port to the downstream port informing the downstream port that the SAQ is being de-allocated. This might be for a number of possible reasons. Examples include that the SAQ has become empty and that a predetermined period of time has passed without any other data packet being received into the SAQ etc.

In one example, each time a request to establish an SAQ message is sent by a port to a port upstream, a token is sent with the request message. The token identifies a leaf port in the congestion tree as mentioned above. Accordingly, all the leaves in the congestion tree will contain a token. In addition, a record is kept at every egress port within switches in the network to keep track of the number of tokens it has sent to upstream ports through different branches of the congestion tree.

When a given egress port receives a de-allocation notification, it waits until it has received all the tokens it previously sent to upstream ports. Only then, can the corresponding SAQ and CAM lines become eligible to initiate a de-allocation message, propagating de-allocation notifications to downstream switches, unless the switch itself is the root of the congestion tree. This provides a means for a port to know if it is eligible to de-allocate an SAQ or not.

Figure 7:
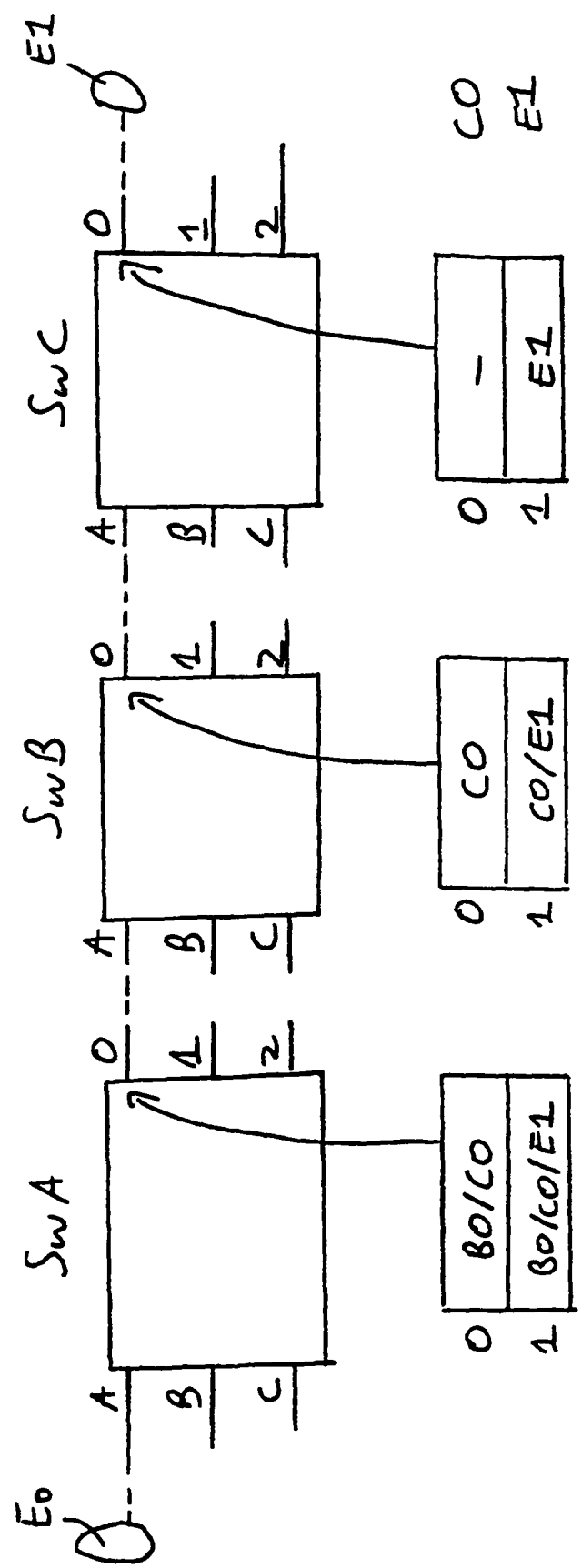
FIGS. 7 and 8 show schematic representations of an example of a network in accordance with an embodiment of the present invention.
Figure 8:
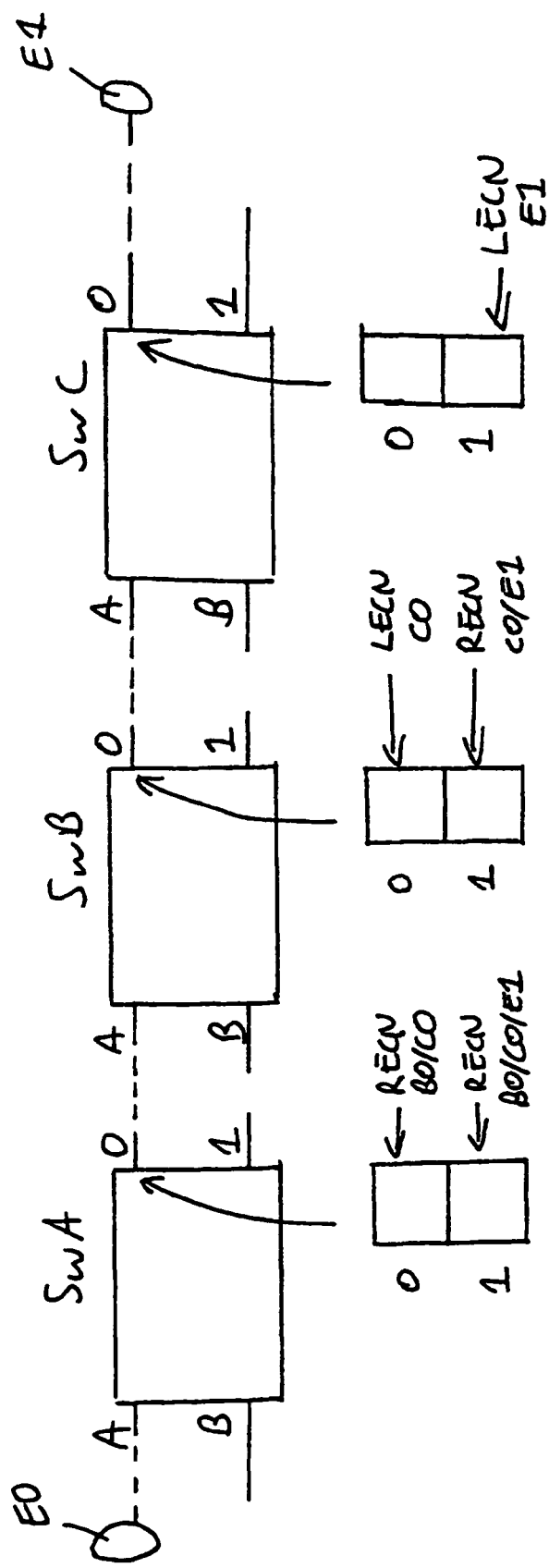

Referring now to FIGS. 7 and 8. FIG. 7 shows a schematic representation of an example of a network of switches according to an embodiment of the present invention. In the example shown, SAQs are located at switch egress port 0. The figure also shows CAM entries which refer to downstream switch ports or end points of the network. CAM lines 0 show contents for congestion source C0. CAM lines 1 show contents for congestion source E1.

FIG. 8 shows a similar arrangement although in this case each of the switches only has two ingress and two egress ports. Initially, when congestion occurs at end point E1, a LECN protocol is used to establish a SAQ at the egress port 0 of switch C. Subsequently SAQs are established using the RECN protocol described above. In the examples shown, CAM lines 0 relate to source of congestion C0 and CAM lines 1 relate to source of congestion E1. It can be seen that as a switch gets further away from the source of congestion the entries in the CAM lines get more specific so that they can be used to identify packets the furthest upstream port, within the congestion tree all the way to the root of the congestion tree.

There will now be described in detail two further examples of a method for congestion management within a network of switches. In these examples the movement of the root of a congestion tree downstream is achieved. Preferably, this is achieved whilst ensuring the avoidance of OOO effects. In both cases, when a request for storage of data packets received at any of the ports in an existing "original" congestion tree is in respect of congestion at a port further downstream than the root of the original congestion tree, the request is accepted such that data packets destined for said further downstream port are stored at the port at which the request was received. In other words, the root of the congestion tree is moved downstream.

It is preferred that upon receipt of a request for establishment of a set aside queue at a port, as described above, an entry is created in a memory to indicate that congestion has occurred at the particular (further downstream) port. As data packets are received at the port, they are checked against the entry or entries in the memory. If a data packet is directed to the congested port, the data packet is stored in the corresponding set aside queue.

Figure 1:
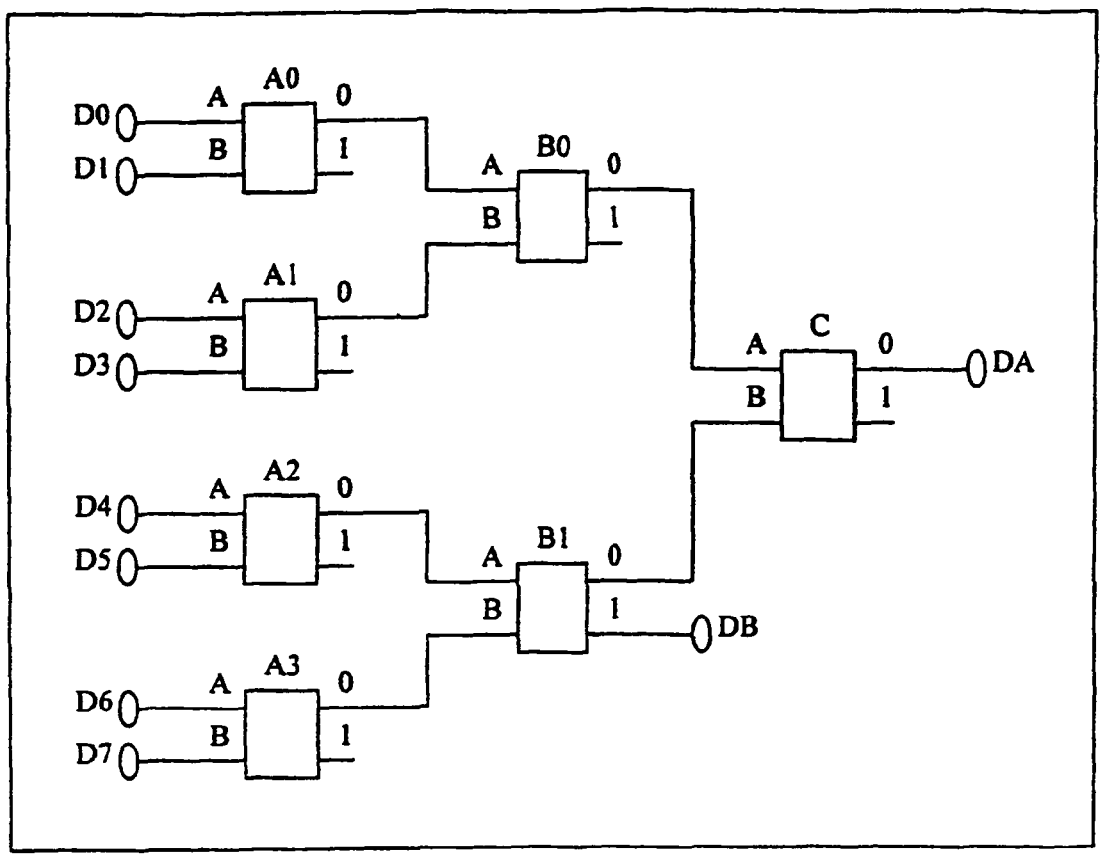
FIG. 1 shows an example of a network of switches.

As explained above with reference to FIG. 1, it has been appreciated that there are certain network configurations in which it is desirable to enable the movement of the root of a congestion tree downstream. In one example of the present invention, this is achieved by accepting all requests for establishment of SAQs, even if the request is in respect of a congested port further downstream than the already existing furthest downstream port. This enables network bandwidth utilisation to be maximised whilst simultaneously achieving the benefits of the RECN communications protocol.

Figure 9:
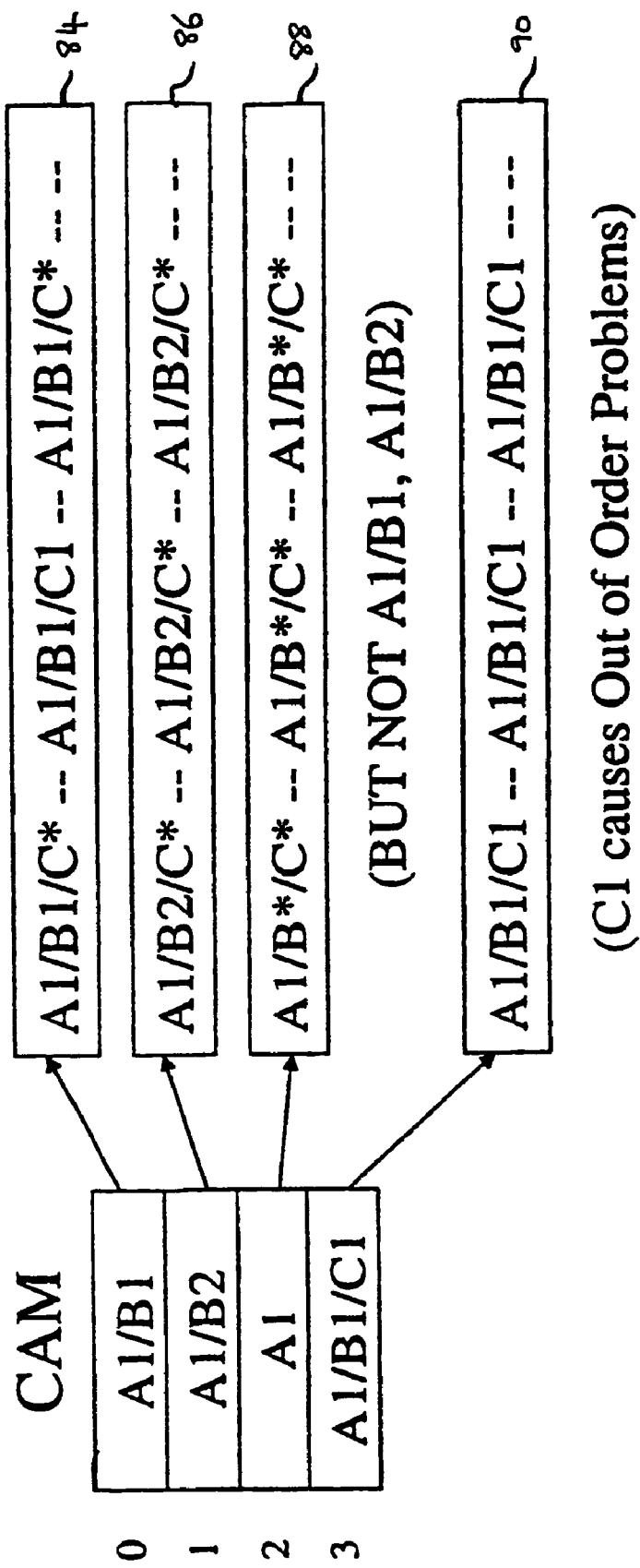
FIG. 9 is a representation of a content addressable memory and a number of set aside queues.

FIG. 9 shows a representation 82 of a CAM and the SAQs 84, 86, 88 and 90 formed based on the entries in the CAM. It can be seen that there are four entries in the CAM arranged respectively in rows 0 to 3 of the CAM.

The SAQ 90 formed based on the A1B1C1 in the CAM may be referred to as the "longest" of the SAQs in this example. It will be appreciated that the term "longest" does not refer to the number of data packets stored in the SAQ, but refers to the fact that the CAM entry that gave rise to it, is the longest, i.e. has the highest number of stages. Similarly, SAQ 88 may be referred to as the "shortest" SAQ in this example as it has the lowest number of stages (only a single stage).

One SAQ 84 is formed to store data packets destined for the port B1 along the route A1/B1. Another SAQ 86 is formed to store data packets destined for the port B2 along the route A1/B2. Another SAQ 88 is formed to store data packets destined for the port A1, but not destined for either of the routes A1/B1 or A1/B2. Last, SAQ 90 stores data packets destined for the port C1 via ports A1 and B1.

It will be appreciated that if the SAQ 90 is formed after the SAQ 84 then it is possible that there will be data packets in the SAQ 84 that arrived before establishment of the SAQ 90. Had these data packets arrived after establishment of the SAQ 90 they would have been stored in the SAQ 90 and not in the SAQ 84. In the example shown, had the data packet A1B1C1 stored in SAQ 84 arrived after establishment of the SAQ 90, it would have been stored in the SAQ 90 and not in the SAQ 84.

This is where in some cases out of order effects can be encountered. One way to address this problem is to stipulate that if a request for establishment of a SAQ is received in respect of a port (C1 in this case) further downstream than the furthest downstream existing congested port (B1 in this case), the request is ignored. In other words, it is determined that it is not possible to move the root of an original congestion tree downstream so as to avoid OOO effects.

If it is required that the root of the congestion tree is moved downstream then it is still possible to avoid OOO effects. One way this may be achieved is by accepting all requests for establishment of a SAQ and by forming a new CAM line (and corresponding SAQ) for each new SAQ formation request received irrespective of the location of the congestion to which it refers. This includes requests for establishment of SAQs for data packets destined for ports further downstream than the root of the original congestion tree. In this case, if out of order effects are to be avoided, links are placed in an existing SAQ or SAQs to later activate the newly formed SAQ. A link serves to make a SAQ to which it points, visible to a scheduler (not shown).

FIG. 10 shows a representation of the sequence of arrival of data packets at a port in a network and the SAQs formed at the port. The figure shows the data packets arranged in a cold queue and a number of SAQs. Referring to the figure, data packets 0 to 44 are shown as arriving at the port. As each data packet arrives, its desired destination is checked against entries in the CAM. If there is a corresponding entry in the CAM the data packet is placed in the corresponding SAQ. If there is no corresponding entry in the CAM, the data packet is placed in the cold queue.

For clarity, a number of the data packets have not been included in the list of data packets. For example, data packets 5 to 9, 15 to 19, 25 to 29 etc. have not been shown. It can be seen that initially data packet 0 A1B1C1, arrives at the port, i.e. a data packet destined for port C1 via ports A1 and B1. This is followed by data packet A1B1C2. After packet 4 has arrived, a request A1B1 arrives at the port. This is a request for establishment of a SAQ for data packets destined for Port B1 via port A1. All data packets that have route A1B1 as all or part of their designated routes will, at this stage in the absence of any other SAQs, be stored in the SAQ A1B1. For example, data packets with routes A1B1C1, A1B1C2 and A1B1C3 etc will be stored in the SAQ A1B1. A SAQ A1B1 is established and an activating link (R/L A1B1) is placed in the cold queue at the port, linking the cold queue to the SAQ A1B1 established in response to the request.

Packets 10 and 11 (A1B1C1 and A1B1C2) arrive and these are placed in the established SAQ A1B1. Packets 12 to 14 are stored in the cold queue since there is no SAQ at present for any of their intended routes A1B2C1, A1B2C2 and A1B3C1. After packet 14, a request for establishment for a SAQ for all data packets routed to or via port A1 is received. This request is in respect of a port closer (i.e. fewer separating stages) to the port receiving the request than a port in respect of which there is an already existing SAQ. It is a "less specific" request. A CAM line A1 is formed, as is a corresponding SAQ. A link to the SAQ A1 is placed in the cold queue. Packets 22 to 24 that arrive subsequently are placed in the SAQ A1, since each of the packets is set to be routed via port A1, but not subsequently port B1.

After packet 24, a request A1B1C1 arrives for establishment of a SAQ for data packets destined for the route A1B1C1. This is a request in respect of congestion further downstream than the already existing farthest downstream congested port, i.e. further downstream than the root of the existing or original congestion tree. The request may be described as "more specific" than any of the existing SAQs (A1B1 and A1). Accordingly, a corresponding new SAQ A1B1C1 is established and an activating link for the new SAQ A1B1C1 is placed in an existing SAQ to avoid potential out of order effects. The link is placed in the longest existing SAQ, i.e. that which corresponds to the CAM entry containing the largest number of stages, but which has fewer stages than the new SAQ. In other words, in this case the link to the SAQ A1B1C1 is placed in the SAQ A1B1 and not in the SAQ A1.

Packet 30 that subsequently arrives is now placed in the SAQ A1B1C1. However, there is no risk of out of order effects since it will only be transmitted after the packets 10 and 20 already in SAQ A1B1. It will be appreciated that by accepting more specific SAQ requests the root of the congestion tree is moved downstream.

Another example of the method for enabling the movement of the root of a congestion tree further downstream whilst avoiding out of order effects will now be described. In this example, CAM lines are overwritten when a new request is received, and the new request either includes all stages of the route defined by the existing CAM line or is less specific than an existing CAM line.

In summary, this example requires that:

(a) if a request for establishment of a new SAQ is in respect of a root port that is further upstream than existing root ports, the shortest i.e., least specific existing CAM line and its corresponding SAQ is overwritten. A link is placed in the cold queue to the new SAQ corresponding to the overwritten CAM line and any existing activating links in the cold queue for the original (now overwritten) SAQ are invalidated; and (b) if a new request for establishment of a SAQ is in respect of a root port that is further downstream than existing root ports, the shortest (least specific) existing SAQ is overwritten, and the overwritten SAQ is linked to the end of the cold queue i.e. in effect all entries in the least specific existing SAQ are placed at the end of the cold queue. An activating link is placed in the longest (most specific) remaining SAQ, or the cold queue if the SAQ does not exist.

This example will now be described with reference to FIG. 11. FIG. 11 shows a cold queue and a number of SAQs formed at a port in a switch in a network of connected switches. As in the example shown in FIG. 10, for clarity and conciseness a number of data packets have not been shown. Referring to FIG. 11, initially, data packets 0 to 4 arrive and are all stored in the cold queue. After packet 4, request A1B1 for establishment of a SAQ for storage of packets destined for the route A1B1 arrives. There are no existing SAQs and so a SAQ for A1B1 is established. An activating link (R/L A1B1) to the A1B1 SAQ is placed in the cold queue. Packets 10 and 11 that arrive subsequently are placed in the SAQ A1B1. Packets 12 to 14 arrive subsequently and are stored in the cold queue.

After packet 14, request A1B2 arrives. There are no existing SAQs with which the request A1B2 clashes i.e. no SAQ A1B2 is already formed so a SAQ A1B2 is formed. An activating link (R/L A1B2) to the SAQ A1B2 is placed in the cold queue. Subsequently, packets 20 to 23 arrive and these are placed in SAQs A1B1 and A1B2 accordingly.

After packet 24 has arrived, request A1 arrives. This is a less specific request than some existing SAQs (i.e. A1B1 and A1B2). In accordance with the present example, one of the CAM lines corresponding to the SAQs A1B1 and A1B2 is overwritten, i.e. replaced with a new CAM line A1. To avoid out of order problems, the shortest existing SAQ is selected for overwriting i.e. the SAQ corresponding to the CAM line entry having the smallest number of stages. If, as in this case, there is no shortest SAQ then any (either in this case) may be picked from the existing shorter SAQs. Since the new SAQ is shorter than the existing SAQ being overwritten, data packets already assigned to the existing SAQ do not need to be moved. This is because had they have arrived when only the new shorter SAQ existed, they would have been placed in that shorter SAQ anyway.

In this case, the CAM entry A1B2 is overwritten without the requirement to move any packets in the SAQ A1B2. A link (R/L A1) to the A1 SAQ is placed in the cold queue. If it still exists in the cold queue, the existing link A1B2 must now be ignored. This is achieved by providing links with sequence numbers so that only the highest matching link can activate a SAQ.

Packets 30 to 34 subsequently arrive and these are placed in SAQs A1B1 and A1 accordingly, i.e. packets 30 and 31 are placed in SAQ A1B1 and packets 32 to 34 are placed in SAQ A1.

After arrival of packet 34, a request A1B1C1 arrives. This is a more specific request than all the existing CAM lines and SAQs. Again, one of the existing CAM lines corresponding to an SAQ is overwritten. The shortest SAQ is selected. In this case this is SAQ A1. To avoid out of order effects the existing A1 SAQ is linked to the cold queue via a link 92. In effect, the data packets stored in the SAQ A1 are moved to the end of the cold queue. If this were not done, a new data packet A1B2C1, e.g. packet number 42 may be selected for transmission from the port by the scheduler before the packets A1B2C1 (packets 22 and 32) stored in the SAQ A1. Of course SAQ A1 contains all data packets previously assigned to the SAQ A1B2.

An activating link 94 to the SAQ A1B1C1 is placed in the existing SAQ which is the next longest SAQ. In this case this is SAQ A1B1. Packets 40 and 41 subsequently arrive and these are placed in the corresponding SAQs (A1B1C1 and A1B1 respectively).

It will be appreciated that according to the example described above within one or more SAQs there may be links to other SAQs. This is necessary in this example to avoid the out of order effects that would otherwise occur due to the acceptance of more detailed requests.

The methods described herein are applicable to any network of switches in which congestion may occur.

Embodiments of the present invention have been described with particular reference to the examples illustrated. However, it will be appreciated that variations and modifications may be made to the examples described within the scope of the present invention.

The invention claimed is:

1. A method of congestion management within a switch or network of connected switches wherein at least one of the switches has a plurality of ingress ports and a plurality of egress ports, the method comprising:
   when congestion is detected at a first ingress or egress port, sending a message to an upstream port connected to the first ingress or egress port indicating that congestion has occurred at a particular port and requesting storage at the upstream port of data packets destined for the first ingress or egress port; and,
   in dependence on the amount of data packets destined for the congested port stored at said upstream port, sending from the upstream port to a further upstream port a message informing said further upstream port of the congestion at the first ingress or egress congested port, said further upstream port storing at said further upstream port data packets destined for the first ingress or egress congested port.

2. A method according to claim 1, comprising at said upstream port, allocating memory for use as a set-aside-queue for data packets destined for the congested port.

3. A method according to claim 2, comprising:
   at said upstream port creating an entry in a memory to indicate that congestion has occurred at the particular port ; and,
   checking packets subsequently received at the upstream port against the entry in the memory and, if a packet is directed to the congested port, storing said packet in the corresponding set aside queue.

4. A method according to claim 3, wherein the memory is provided as an associative memory.

5. A method according to claim 2, in which the message requesting establishment of a set aside queue is discarded by the upstream port if the congestion identified in the request is further downstream than the original congestion.

6. A method according to claim 2, comprising, at said further upstream port, allocating memory for use as a set-aside-queue for data packets destined for the first ingress or egress congested port.

7. A method according to claim 1, the method comprising within the upstream port, allocating one or more set aside queues in dependence on messages received from the first port.

8. A method according to claim 7, further comprising within the upstream port controlling data flow into and out of the set aside queue in dependence on the congestion.

9. A method according to claim 8, comprising de-allocating the one of more set aside queues in dependence on one or more criteria.

10. A method according to claim 9, in which the one or more criteria include the amount of data in the set aside queue.

11. A method according to claim 1, in which the message indicating that congestion has occurred includes a token to be kept by the upstream port to identify the upstream port as a leaf port within a congestion tree.

12. A method according to claim 11, comprising storing data about the number of leaves in the congestion tree in each switch in the tree.

13. A method according to claim 11, in which when a set aside queue is de-allocated, the leaf token is returned by the upstream switch to the adjacent downstream switch, the method comprising maintaining a record relating to leaf switches that have returned a leaf token.

14. A method according to claim 1, comprising when a subsequent packet is received by the upstream port, if it is destined for the congestion, storing it in a set aside queue, and if it is not destined for the congestion, storing it in a cold queue at the upstream port.

15. A method according to claim 14, comprising when a packet is received at the upstream port that is destined for the congestion, storing a marker in the cold queue to provide an indication of the order in which the congestion-bound packet was received with respect to packets already in the cold queue which are also destined for the congestion.

16. A method of congestion management within a switch or network of connected switches wherein the or each of the switches has a plurality of ingress ports and a plurality of egress ports, the method comprising:
   when congestion is detected at a first ingress or egress port, sending a message to an upstream port connected to the first ingress or egress port indicating that congestion has occurred at a particular port and requesting storage at the upstream port of data packets destined for the first ingress or egress port; and,
   in dependence on the amount of data packets destined for the congested port stored at said upstream port, sending from the upstream port to a further upstream port a message informing said further upstream port of the congestion at the first ingress or egress congested port, said further upstream port storing at said further upstream port data packets destined for the first ingress or egress congested port comprising at said upstream port, allocating memory for use as a set-aside-queue for data packets destined for the congested port, at said upstream port creating an entry in a memory to indicate that congestion has occurred at the particular port; and, checking packets subsequently received at the upstream port against the entry in the memory and, if a packet is directed to the congested port, storing said packet in the corresponding set aside queue wherein the memory is provided as an associative memory in which the associative memory is equipped with a binary command vector operable to engage search logic which in one case is for a set aside queue formation request and thereby performs a minimal length matching operation on the contents of the associative memory and in the case of the assignment of a data packet to a pre-existing set aside queue, thereby performs a maximal length matching operation on the contents of the associative memory.

17. A method according to claim 16, comprising following receipt of a set aside queue establishment message by the upstream switch, the resulting binary vector that represents the path between the current switch network position and the final congested network destination is left aligned to the index of the current switch position and equipped with a mask, the mask being the size of the bit field describing the route to the congested destination prior to storage in an associative memory element.

18. A method according to claim 17, whereby data applied to a search register of the associative memory is prior to searching the associative memory elements at its current switch position in a network, left aligned to the index of the current switch network position and equipped with a mask for the purposes of comparison with the stored elements of the associative memory.

19. A method according to claim 18, wherein a pair of additional inverted bits are used to delineate the start and stop positions of the active section of a turnpool thereby to create a sized mask.

20. A switch for use in a network of switches, the switch comprising:
two or more ingress ports;
two or more egress ports;
a switch fabric for selectively coupling data packets received at one or more of the ingress ports to one or more of the egress ports;
storage for, in response to a request for storage of data packets destined for a downstream congested port, storing selected data packets;
selection means, for selectively routing a received data packet to the storage in dependence on the detected desired destination of the packet; and
request generation means arranged to send a request to a further upstream port to request storage of data packets destined for the downstream congested port at said further upstream port when a threshold amount of data packets destined for the downstream congested port are stored in the storage.

21. A switch according to claim 20, in which the selection means comprises a content addressable memory.

22. A switch according to claim 20, wherein a set aside queue is only formed in response to the request if one or more of a number of criteria are satisfied.

23. A network of interconnected switches connected in a topology, the network comprising a plurality of switches wherein at least two of the switches are switches according to claim 20.

24. A switch for use in a network of switches, the switch comprising:
a plurality of ingress ports for receiving data packets;
a plurality of output ports for transmitting data packets; and,
control means for selectively routing data packets received at one or more of the ingress ports to one or more of the egress ports;
wherein at least one of the ingress ports or egress ports comprises storage for storing details of a congestion tree comprising at least three connected ports in which in use, the switch is located,
which at least one of the ingress or egress ports comprises an ingress or egress engine configured in use to receive a data packet; determine from the data packet its eventual destination; and, if the data packet is destined for a congested port to store the packet in the set aside queue and if it is destined for an uncongested port to store the packet in a cold queue for transmission to the uncongested port,
the switch being controllable, when connected in a network of switches to execute the method of congestion management within a switch or network of connected switches wherein the or each of the switches has a plurality of ingress ports and a plurality of egress ports, the method comprising:
when congestion is detected at a first ingress or egress port, sending a message to an upstream port connected to the first ingress or egress port indicating that congestion has occurred at a particular port and requesting storage at the upstream port of data packets destined for that port; and,
in dependence on the amount of data packets destined for the congested port stored at said upstream port, sending from the upstream port to a further upstream port a message informing said further upstream port of the congestion at the first ingress or egress congested port, said further upstream port storing at said further upstream port data packets destined for the first ingress or egress congested port.

25. A switch according to claim 24, in which at least one of the ingress or egress ports comprises means for generating a set aside queue for storage of received data packets destined for a port in the congestion tree.

26. A switch according to claim 24 in which at least one of the ingress or egress ports is configured in use to generate a set aside queue in response to a request received by the ingress or egress port containing information about congestion at a downstream port, the request containing information about a congested route between the switch and the downstream port.

27. A switch according to claim 24, in which the ingress or egress engine are embodied in a content addressable memory.

28. An endstation for use in a network of interconnected switches, the end station comprising:
an ingress port for receiving data packets from a network to which in use the end station is connected;
an egress port for providing data packets to a network to which in use the end station is connected;
in which the egress port includes means operable in use to receive a message from a downstream port, the message containing data relating to a congested port further downstream than the downstream port and a request to provide storage for data packets destined for the congested port further downstream.

29. An endstation according to claim 28, comprising a control device operable in use to, in response to the message received from the network, allocate a set-aside queue for storing of data packets destined for the congested port.

30. A method of congestion management within a switch or network of connected switches wherein the or each of the switches has a plurality of ingress ports and a plurality of egress ports, the method comprising:
  when congestion is detected at a first ingress or egress port, sending a message to an upstream port connected to the first ingress or egress port indicating that congestion has occurred at a particular port and requesting storage at the upstream port of data packets destined for the first ingress or egress port; and,
  in dependence on the amount of data packets destined for the congested port stored at said upstream port, sending from the upstream port to a further upstream port a message informing said further upstream port of the congestion at the first ingress or egress congested port, said further upstream port storing at said further upstream port data packets destined for the first ingress or egress congested port,
  wherein the step of requesting storage at the upstream port of data packets destined for the congested port comprises requesting establishment of a set aside queue for storage of said data packets; and
  wherein data packets stored at said further upstream port are stored in a set aside queue for data packets destined for the congested port thereby establishing an original congestion tree; and
  when a subsequent request for storage of data packets is received at any of the ports in the original congestion tree in respect of congestion at a port further downstream than the root of the original congestion tree, accepting the request at the port such that data packets destined for said further downstream port are stored at the port at which the request was received thereby extending the congestion tree downstream.

31. A method according to claim 30, comprising upon receipt of a request for establishment of a set aside queue at any of said ports in said original congestion tree creating an entry in a memory at the said port to indicate that congestion has occurred at a particular port; and checking data packets subsequently received at the said port against the entry in the memory and, if a data packet is directed to the congested port, storing said data packet in the corresponding set aside queue; and if a data packet is not directed to the or another congested port, storing the data packet in a cold queue for onward transmission.

32. A method according to claim 31, comprising: if a request is for establishment of a set aside queue in respect of a port further upstream than the root of the original congestion tree, overwriting the shortest existing set aside queue with a newly established set aside queue; and placing a link in the cold queue to the newly established set aside queue.

33. A method according to claim 32, comprising: if a request is for establishment of a set aside queue in respect of a port further downstream than the root of the original congestion tree, overwriting the existing shortest set aside queue with a newly established set aside queue corresponding to the received request; and placing a link to the newly established set aside queue in the already existing set aside queue that is the longest already existing set aside queue and that is shorter than the newly established set aside queue.

34. A method according to claim 31, comprising: establishing a set aside queue in response to every request for establishment of a set aside queue received at the port, the newly established set aside queue existing concurrently with any already existing set aside queues.

35. A method according to claim 34, comprising: when a request is for establishment of a set aside queue in respect of a port further downstream than the root of the original congestion tree, placing a link in an existing set aside queue to later activate the newly established set aside queue.

* * * * *